United States Patent [19]
DiPlacido et al.

[11] Patent Number: 6,092,108
[45] Date of Patent: Jul. 18, 2000

[54] DYNAMIC THRESHOLD PACKET FILTERING OF APPLICATION PROCESSOR FRAMES

[76] Inventors: Bruno DiPlacido, 12 Boathouse La., Dedham, Mass. 02026; Lawrence A. Boxer, 160 Sterns St., Carlisle, Mass. 01741

[21] Appl. No.: 09/044,804

[22] Filed: Mar. 19, 1998

[51] Int. Cl.[7] ............................. G06F 13/38; G06F 15/17
[52] U.S. Cl. .......................... 709/224; 709/235; 709/238; 709/239; 709/249; 709/250; 370/429; 370/254; 370/418; 370/498; 710/56; 710/57; 710/131; 710/132; 340/825.03
[58] Field of Search ..................................... 709/224, 235, 709/249, 250, 238, 239; 340/825.03; 710/100, 131, 132, 56, 57; 370/498, 254, 229, 418

[56] References Cited

U.S. PATENT DOCUMENTS

| | | | |
|---|---|---|---|
| 5,548,646 | 8/1996 | Aziz et al. ................................. | 380/23 |
| 5,600,798 | 2/1997 | Cherukuri et al. ....................... | 709/203 |
| 5,689,500 | 11/1997 | Chiussi et al. ........................... | 370/235 |
| 5,721,944 | 2/1998 | Gallet et al. ............................. | 395/800 |
| 5,724,358 | 3/1998 | Headrick et al. ........................ | 370/418 |
| 5,761,683 | 6/1998 | Logan et al. ............................. | 707/513 |
| 5,764,641 | 6/1998 | Lin ........................................... | 370/412 |
| 5,765,032 | 6/1998 | Valizadeh ................................ | 709/235 |
| 5,790,290 | 8/1998 | Kitajima et al. ......................... | 359/139 |
| 5,793,976 | 8/1998 | Chen et al. .......................... | 395/200.54 |
| 5,796,956 | 8/1998 | Jones ....................................... | 709/233 |
| 5,801,641 | 9/1998 | Yang et al. .............................. | 340/826 |
| 5,802,310 | 9/1998 | Rajaraman .............................. | 709/234 |
| 5,832,236 | 11/1998 | Lee .......................................... | 709/249 |
| 5,832,310 | 11/1998 | Mossissey et al. ...................... | 395/891 |
| 5,875,314 | 2/1999 | Edholm .................................... | 395/312 |
| 5,896,379 | 4/1999 | Habor ...................................... | 370/390 |
| 5,936,969 | 8/1999 | Des Jardins et al. ................... | 370/229 |
| 5,949,789 | 9/1999 | Davis et al. ............................. | 370/452 |
| 5,953,335 | 9/1999 | Erimli et al. ............................ | 370/390 |
| 5,982,741 | 11/1999 | Ethier ..................................... | 370/201 |
| 6,006,275 | 12/1999 | Picazo, Jr. et al. ..................... | 709/249 |
| 6,012,099 | 1/2000 | Chung .................................... | 709/249 |
| 6,021,442 | 2/2000 | Ramanan et al. ....................... | 709/238 |

OTHER PUBLICATIONS

Paul A. Strassmann, Risk–Free Access into the global information infrastructure via anonymous re–mailers, www.strassmann.com/pubs/anon–remail.html, total 14 pages, Jan. 28, 1996.

Taborek, Gigabit Ethernet Serial Link codes, Amdahl Corporation, 27 pages, Jul. 1996.

3com, superstack II, http://www.3com.com/product, 37 pages, Feb. 2000.

Howard M. Frazier, Jr., Gigabit Ethernet an overview, http://www.computer.org/internet/v1n5/ether.htm, 4 page, Sep. 1998.

Jonathan tuner, Terabit Burst Switching, http://www.arl.wustl.edu/arl/projects/burst/, 23 pages, Oct. 1999.

*Primary Examiner*—Frank J. Asta
*Assistant Examiner*—Bunjob Jaroenchonwanit

[57] ABSTRACT

A multiported device is provided connected to a switching device providing switching functions. The multiported device receives frames and is connected to an application processor. Some of the received frames are passed to the application processor via an application processor port having a port bandwidth. The multiported device includes an application receive buffer having a receive buffer size for storing frames and providing frames to the application processor for processing. A programmable logic unit is provided for monitoring a level of data in the receive buffer and monitoring a type of frame forwarded to said application processor. The frames each have a descriptor frame associated with it with data indicating one or more of priority status and broadcast/unicast status. The logic unit monitors the level of data based on at least one threshold level for dropping frames upon a data level in said receive buffer reaching the threshold level which have a status. The status is one the one or more of priority status and broadcast/unicast status.

17 Claims, 3 Drawing Sheets

DYNAMIC THRESHOLD PACKET FILTERING OF APPLICATION PROCESSOR FRAMES

FIELD OF THE INVENTION

The present invention relates to crosspoint switch arrangements and more particularly to local area network (LAN) switching systems such as Ethernet systems (IEEE 802.3 which is hereby incorporated by reference) where at least one switch is connected to units with a plurality of ports.

BACKGROUND OF THE INVENTION

Crosspoint switch matrices are useful for providing plural ports for interconnection of various components. Specifically, the crosspoint switch connects one of many input lines to one or more output lines. Initially crosspoint integrated circuits switches were developed to replace electromechanical switches such as relays in electrical telephone-switching systems. Crosspoint switches are now used in parallel processing, industrial-control-routing and data communication systems. Cross point switches are known which use decoding elements and/or multiplexers to form the desired connections. The complexity of these devices extensively increases as the number of input ports and output ports is increased. The crosspoint switches are typically limited to a relatively small number of input terminals and output terminals. The total number of input and output terminals (ports) of prior art crosspoint switches typically ranges from 8 to 128.

Switches have been used such as crosspoint switches for Ethernet applications wherein units are connected to the switch and the units have ports for various end users or for connections to other switches. As frames are received by the switch, some of the frames must be sent to an application processor. The application processor may have an application processor receive buffer of a given size and with a defined bandwidth allocated to the application processor port. This results in the situation that the buffer can fill and cause blocking of the entire switch. It is certainly possible to increase the size of the application processor receive buffer. This necessarily adds significant cost to the product. Another possible solution is to increase the bandwidth allocated to the application processor port. This has the drawback of unfavorably impacting the wire speed performance of the switch and/or adding costs to the products.

SUMMARY AND OBJECTS OF THE INVENTION

It is an object of the invention to provide an application processor receive buffer of a given size (such as 64K bytes) and provide minimum allocation of bandwidth to the application processor (provide a given bandwidth allocation to the application processor port) or to add programmable logic which monitors both the levels of data in the application processor buffer and the types of frames forwarded to the application processor.

According to the invention a multiported device is provided connected to a switching device providing switching functions. The multiported device receives frames and is connected to an application processor. Some of the received frames are passed to the application processor via an application processor port having a port bandwidth. The multiported device includes an application receive buffer having a receive buffer size for storing frames and providing frames to the application processor for processing. A programmable logic unit is provided for monitoring a level of data in the receive buffer and monitoring a type of frame forwarded to said application processor. The frames each have a frame descriptor associated with it with data indicating one or more of priority status and broadcast/unicast status. The logic unit monitors the level of data based on at least one threshold level for dropping frames upon a data level in said receive buffer reaching the threshold level which have a status. The status is one or more of priority status and broadcast/unicast status.

Preferably each frame descriptor indicates one of low priority and high priority. Each frame descriptor also includes a field (portion) indicating whether the frame is a unicast or a broadcast frame.

The programmable logic unit considers two data level thresholds, including a first less than full receive buffer threshold and a second less than full receive buffer threshold. Frames sent to said application processor which are broadcast frames are preferably dropped upon the data level reaching a first programmable data level. Broadcast frames and low priority frames are dropped upon reaching the second threshold. The programmable logic unit drops all frames sent to the application processor receive buffer upon the buffer reaching a full level.

The programmable logic unit also preferably includes dropped frame counting means for counting dropped frames.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
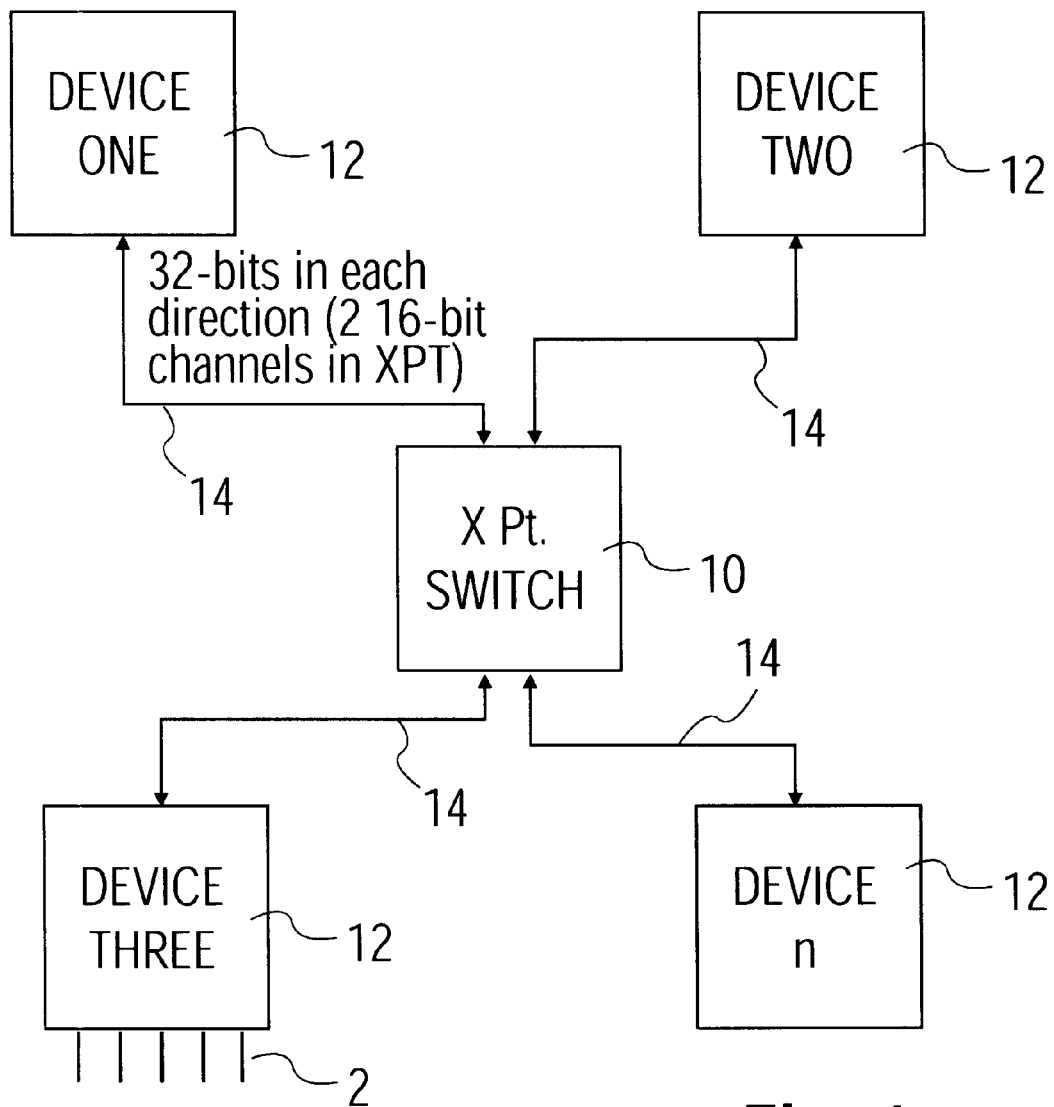
FIG. 1 is a diagram showing a crosspoint switch based system with connected devices.

Referring to the drawings in particular, the invention provides a control logic unit unit generally designated 30. The control logic 30 includes hardware to provide control logic for frames received from a cross point switch 10. The control logic is programmable as described further below.

A cross point switch 10 is used to provide switching between n connected devices 12 for a LAN system. The system may for example be a gigabit Ethernet system. Each device 12 may be a media module providing connections to end users (and/or a switching device) via connections 2 using known media. The devices 12 are connected to the switch 10 by appropriate connections such as connections providing 32-bits in each direction.

The preferred embodiment provides gigabit ethernet chip 120 which is part of a gigabit ethernet media card or module. Physically, the switch and ethernet cards may be in a chassis.

The gigabit ethernet chip includes the control logic unit on control logic shared resource 30 connected via connections 38 to transmit ports (IX Port) 18 via port buffers 16 and connections 17. The control logic shared resource 30 is also connected via connections 44 to an application processor 50 via connection 44 and application processor buffer 40. The control logic shared resource 30 controls and monitors the frames arriving from the crosspoint switch chip at 14.

Figure 2:
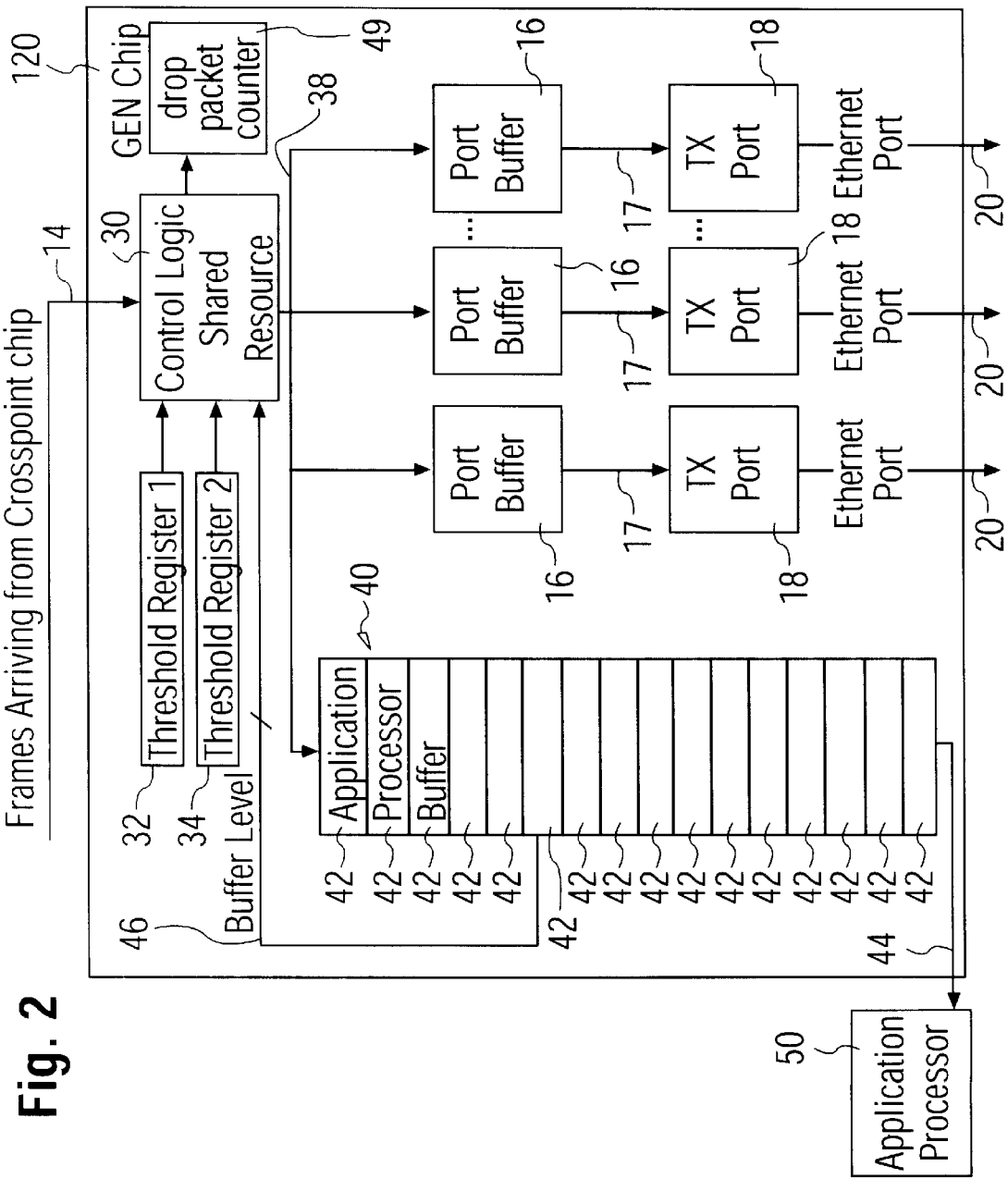
FIG. 2 is a diagram showing a frame with a headerfield which contains priority information for the frame.

The application processor buffer 40 in the example is a 64K byte buffer. The control logic unit divides the buffer into sixteen equal regions 42 in the preferred example (other divisions with other processor arrangements are also possible). The control unit monitors frames to AP buffer 40 including a monitoring of the type of frame as discussed below. With the arrangement as shown in FIG. 2, based on the size of the application processor receive buffer 40 and the bandwidth allocated to the port 44, the buffer could fill causing blocking in the switch 10. Such a blocking prevents frames from being transmitted at transmit ports 18 to ethernet port 20.

Figure 3:
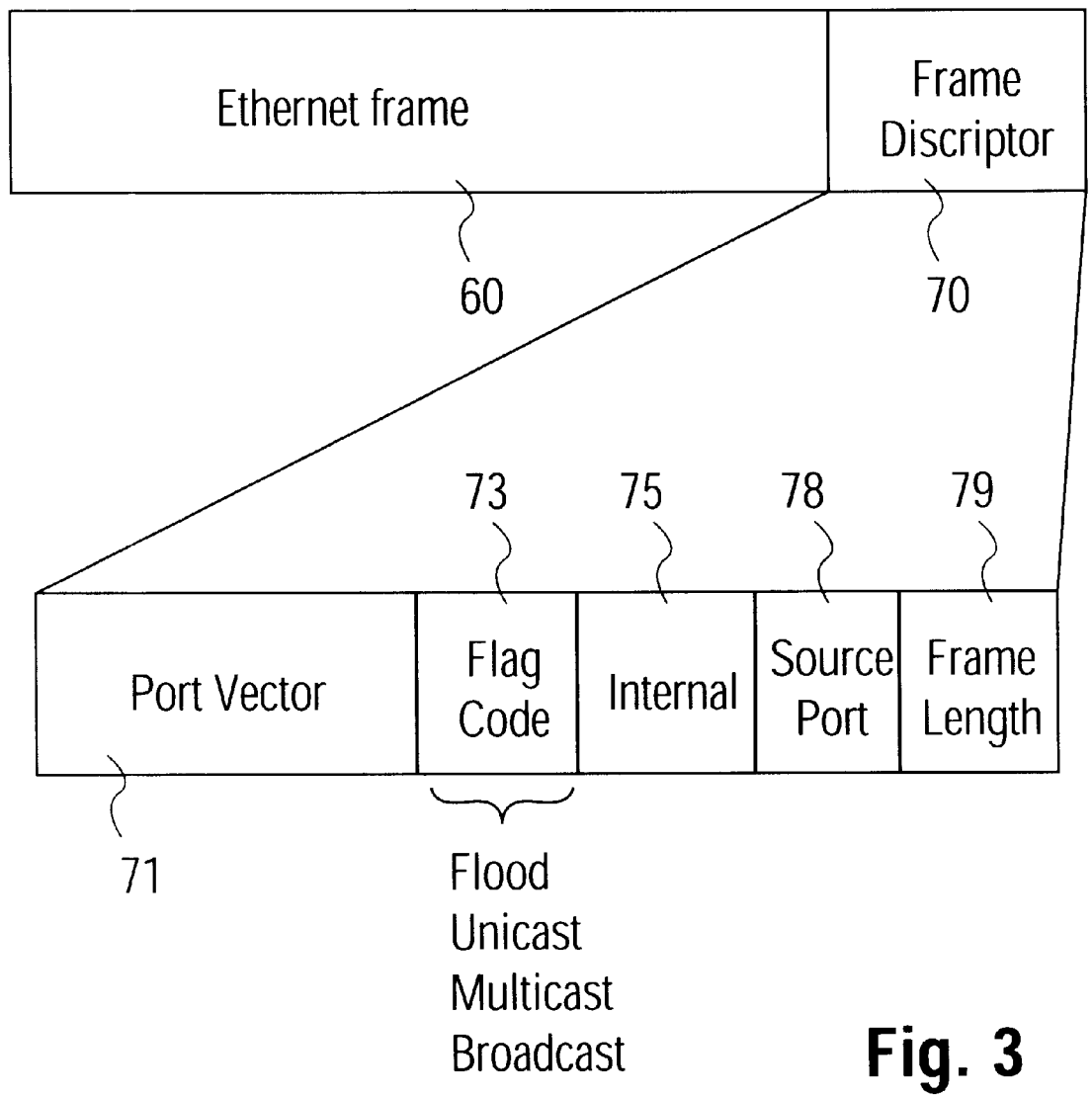
FIG. 3 is a system diagram showing features of the invention.

As shown in FIG. 3, The system of the invention provides an ethernet frame 60 with a frame descriptor 70. The frame descriptor in the example includes port vector portion 71, flag code portion 73, internal portion (for priority etc.), source port portion 78 and frame length portion 79. The internal portion 75 includes data which indicates either low priority or high priority. The flag code portion 73 includes data which indicates whether the Ethernet frame 60 is a unicast frame (for one port) or a broadcast frame (going to several ports). Each frame that is passed to the application processor buffer 40 is passed with the frame descriptor.

Programmable threshold registers 32 and 34 each provide threshold data or "watermark" data. The logic unit reads the programmable water marks or thresholds and creates four categories of frames. According to the invention, the preferred categories include: high priority, low priority, unicast and broadcast.

The logic unit 30 monitors the AP buffer 40 via buffer level line 46. based on water marks or thresholds. Preferably two water marks are set (two different thresholds). The logic unit 30 provides for a dropping of frames from the logic buffer depending upon the priority and depending upon the extent which the buffer has filled. This is especially advantageous as if the buffer is filled, this can cause blocking. However, if a frame is dropped, a frame destined to a port will not be held up.

The logic unit monitors the sixteen equal regions 42 of the AP buffer 40 based on water mark or thresholds. Preferably two water marks are set (two different thresholds) such as a first data level set between an empty buffer region level and a full buffer region level and a second data level set between an the first data level and a full buffer region level.

The logic is programmed such that when the amount of data in the buffer is less than the first water mark, all application processor frames are stored in the buffer. When the level in the buffer reaches the first water mark but is less than the second water mark all application processor broadcast frames are dropped. When the level in the buffer is greater than the second water mark but not full all application processor broadcast frames and low priority frames are dropped. Once the buffer is full all AP frames are dropped.

The logic unit preferably also counts each frame that is dropped at drop packet counter 49 such that levels can be monitored. This may be used to provide statistics for administrator analysis of the system. The invention has the significant advantage of not blocking frames being sent to transmission buffers 16 (frames being directed to ports 18). By dropping frames based on priority, the need to drop high priority frames is significantly reduced, based on using the multiple watermark (multiple threshold) system of the invention.

While a specific embodiment of the invention have been shown and described in detail to illustrate the application of the principles of the invention, it will be understood that the invention may be embodied otherwise without departing from such principles.

What is claimed is:

1. A multiported device and switching device combination comprising:

a multiported device with a plurality of ports, each of said ports having an associated end user connected thereto via a medium;

a switching device providing switching functions, said switching device being connected to said multiported device with said multiported device receiving frames;

an application processor associated with said multiported device said application processor including an application processor port having a port bandwidth;

an application processor receive buffer for storing frames providing frames to said application processor for processing, said receive buffer having a buffer full data level;

a programmable logic unit for controlling frames arriving from said switching device, for monitoring frames forwarded to said ports, for monitoring a level of data in said receive buffer and monitoring a type of frames forwarded to said application processor, each frame being associated with a frame descriptor including data indicating status including a data field with data indicating one of low priority and high priority and a data field indicating whether the frame is a unicast or a broadcast frame said programmable logic unit considers two data level thresholds, including a first less than full receive buffer data level threshold and a second less than full receive buffer data level threshold, said logic unit dropping frames to be sent to said application processor receive buffer which are broadcast frames upon reaching said first threshold and for dropping frames to be sent to said application processor receive buffer which are broadcast frames and which are low priority frames upon reaching said second threshold.

2. The device according to claim 1, wherein said programmable logic unit drops all frames to be sent to said application processor receive buffer when said application processor receive buffer is full.

3. The device according to claim 1, wherein said programmable logic includes dropped frame counting means for counting dropped frames.

4. An Ethernet switching system, comprising;

crosspoint switching device for providing switching functions, between connected devices;

devices connected to said switching means, each of said devices including ethernet port connections, each port connection having an ethernet transceiver connected to a physical medium, each of said devices receiving frames from said switching means;

an application processor associated with at least one of said devices, said application processor for receiving some of said frames from said switching means via said at least one of said devices, said application processor including an application processor port having a port bandwidth;

an application processor receive buffer connected to said application processor having a receive buffer size for storing application processor frames and providing frames to said application processor for processing, with each frame stored in said application processor buffer being sequentially output from said buffer and processed by said application processor, said application processor receive buffer being associated with said at least one of said devices;

a programmable logic unit associated with said at least one of said device, said programmable logic unit for controlling frames arriving from said switching device with each frame arriving from said switching device being forwarded to at least one of said ports or said application processor receive buffer, said programmable logic unit for monitoring frames forwarded to said ports, for monitoring a level of data in said application processor receive buffer and monitoring a type of frame forwarded to said application processor receive buffer, each frame being associated with a frame descriptor including status data indicating at least one of priority status and broadcast/unicast status, said logic unit monitoring a level of data in said application processor receive buffer and upon said level reaching said threshold, said programable logic unit dropping one or more frames based on said status data whereby blocking of said switching device is avoided by avoiding blockage of frames arriving from said switching device due to said application processor receive buffer being filled.

5. The switching system according to claim 4, wherein each frame descriptor includes a data field with data indicating one of low priority and high priority.

6. The switching system according to claim 4, wherein each frame includes a data field indicating whether the frame is a unicast or a broadcast frame.

7. The switching system according to claim 4, wherein each frame descriptor includes a data field with data indicating one of low priority and high priority and a data field indicating whether the frame is a unicast or a broadcast frame.

8. The switching system according to claim 7 wherein said programmable logic unit considers two data level thresholds, including a first less than full receive buffer data level threshold and a second less than full receive buffer data level threshold, said logic unit dropping frames to be sent to said application processor receive buffer which are broadcast frames upon reaching said first threshold and for dropping frames sent to said application processor receive buffer which are broadcast frames and low priority frames upon reaching said second threshold and for dropping frames sent to said application processor receive buffer upon said application processor receive buffer becoming full.

9. The switching system according to claim 4, wherein said programmable logic includes dropped frame counting means for counting dropped frames.

10. The switching system according to claim 4, wherein said control logic drops all frames to be sent to said application processor receive buffer upon said application processor receive buffer becoming full.

11. A process for dynamically filtering application processor frames, the process comprising the steps;

providing devices connected to switch, each of said devices including Ethernet port connections, with each port having a port buffer and a transceiver connected to a medium, said devices receiving frames from said switch;

providing an application processor associated with one of said devices including Ethernet port connections and an application processor buffer;

at said one of said devices including Ethernet port connections and associated said processor, forwarding all frames received to one of said port buffers or to said application processor buffer or dropping the frame, whereby said application processor receives some of said frames from said switching means via at least one of said devices, said application processor including an application processor port having a port bandwidth;

buffering data between said switch and said application processor in said application processor receive buffer, said application processor receive buffer having a receive buffer size;

providing a control logic associated with said one of said devices including Ethernet port connections and said application processor;

monitoring a level of data in said receive buffer with said control logic;

monitoring a type of frame to be forwarded to said application processor with said control logic;

associating each frame with a frame descriptor including data indicating at least one of priority status and broadcast/unicast status;

dropping one or more application frames with said control logic, based on said status and based upon said level of data in said application processor receive buffer reaching said threshold.

12. The process according to claim 11, wherein each frame descriptor includes a data field with data indicating one of low priority and high priority.

13. The process according to claim 11, wherein each frame includes a data field indicating whether the frame is a unicast or a broadcast frame.

14. The process according to claim 11, wherein each frame descriptor includes a data field with data indicating one of low priority and high priority and a data field indicating whether the frame is a unicast or a broadcast frame.

15. The process according to claim 14 wherein said control logic considers two data level thresholds, including a first less than full receive buffer data level threshold and a second less than full receive buffer data level threshold, said logic unit dropping frames to be sent to said application processor receive buffer which are broadcast frames upon reaching said first threshold and for dropping both frames to be sent to said application process receives buffer which are broadcast frames and which are low priority frames upon reaching said second threshold.

16. The process according to claim 11, wherein said programmable control logic includes dropped frame counting means for counting dropped frames.

17. The process according to claim 11, wherein said control logic drops all frames to be sent to said application processor receive buffer upon said application processor receive buffer becoming full.

* * * * *